United States Patent
Cheng et al.

(10) Patent No.: US 9,551,592 B2
(45) Date of Patent: Jan. 24, 2017

(54) METHOD OF COUNTING STEP NUMBER APPLIED IN ELECTRONIC DEVICE

(71) Applicant: GLOBALSAT WORLDCOM CORPORATION, New Taipei (TW)

(72) Inventors: Shih-Yang Cheng, New Taipei (TW); Kung-Yi Ho, New Taipei (TW)

(73) Assignee: GLOBALSAT WORLDCOM CORPORATION, New Taipei (TW)

( * ) Notice: Subject to any disclaimer, the term of this patent is extended or adjusted under 35 U.S.C. 154(b) by 0 days.

(21) Appl. No.: 14/688,490

(22) Filed: Apr. 16, 2015

(65) Prior Publication Data

US 2016/0003639 A1    Jan. 7, 2016

(30) Foreign Application Priority Data

Jul. 3, 2014    (TW) ............................... 103123016 A

(51) Int. Cl.
*G01C 21/00*    (2006.01)
*G01C 22/00*    (2006.01)

(52) U.S. Cl.
CPC .................................. *G01C 22/006* (2013.01)

(58) Field of Classification Search
None
See application file for complete search history.

(56) References Cited

U.S. PATENT DOCUMENTS

| 2011/0224925 A1* | 9/2011 | Tsubata | G01C 5/06 |
| | | | 702/60 |
| 2012/0150488 A1* | 6/2012 | Kamiyama | G01C 22/006 |
| | | | 702/160 |
| 2016/0000359 A1* | 1/2016 | Li | A61B 5/1123 |
| | | | 600/595 |

* cited by examiner

*Primary Examiner* — Long Nguyen

(74) *Attorney, Agent, or Firm* — Muncy, Geissler, Olds & Lowe, P.C.

(57) ABSTRACT

The present disclosure relates to a method of counting step-number. When detecting step-number executed by an electronic device, a g-sensor of the electronic device detects whether the moving speed is normal (one step per second), i.e. the detection result is the G value, or the movement speed has abnormal variation (such as one step per two seconds or five seconds), i.e. the detection result is the G value at Y axis, and the electronic device computes the step-number according to sums of maximum values and minimum values of speed variations every second within a counting period, and average of the sums. The processing unit determines the variation of the step-numbers of the G values and the G values at Y axis, and selects one of the two step-numbers for use as a correct step-number detection result, so as to achieve the objective of precisely computing step-number upon the speed variation.

5 Claims, 5 Drawing Sheets

METHOD OF COUNTING STEP NUMBER APPLIED IN ELECTRONIC DEVICE

This application claims the priority benefit of Taiwan patent application number 103123016, filed on Jul. 3, 2014.

BACKGROUND OF THE INVENTION

1. Field of the Invention

The present disclosure relates to a method of counting step-number applied in an electronic device, more particularly to the method of counting step-number according to different speed variation. In the method of the present disclosure, a g-sensor of the electronic device is used to detect the different varied movement speed, and a processor of the electronic device adopts different step-number counting manners to compute step-number, so as to achieve an objective of precisely counting the step number.

2. Description of the Related Art

With economic prosperity of the society, people's work and rest in life or job are changed. After busy life and work, the people usually do exercise in outdoor activities or gymnasium to increase exercise amount for keeping strong and healthy. Some strenuous exercises such as jogging, playing ball, swimming or exercising with fitness equipment, can provide exercise effect more quickly, but the strenuous exercises also easily cause exercise damages, and the warm-up exercise is very important before the strenuous exercise and the people must be careful during the strenuous exercises. Therefore, many persons select easier exercises such as brisk walking or normal walking, so as to achieve effect of keeping healthy without too large body burden and prevent from exercise damages. More particularly, most elder persons who have limited fitness and bad health conditions do walking exercises to keep body healthy. In order to understand step-number for use as a reference to judge daily amount of exercise, many persons carry pedometers to compute step-number during walking. The traditional pedometer counts the step-number according to times of vibration detected by the detector disposed inside the pedometer due to the movement of the human body. However, during the walking exercise, speed of moving step may be varied by different factors. For example, at beginning of walking the body condition is better, so the step movement is regular and the step-number can be detected more precisely. However, while walking time is longer, the step movement may become irregular and the moving status is sometimes slow, pause or rest, so the pedometer cannot detect the vibration of body movement and the phenomenon of detecting incorrect step-number is easily occurred. Moreover, the step speed is also affected in different walking places, such as cement floor, runway of a playing field, lawn, ramp, or stair, and the irregular movement state caused by the variation of the step speed also affect the carried pedometer to sometimes detect the vibration of the body and sometimes ignore the movement speed caused by a tiny vibration. In such situation, the inaccurate step-number is generated and directly causes the precision of the carried pedometer counting the step-number to be suspected, and the pedometer cannot perform normal function of counting step-number. Moreover, upon users' likes, the pedometers can be carried at different positions of the users' bodies, such as wrist, waist or ankle. Because different limbs of the human body generate different rhythms during action, for example, when user's feet are moved forwardly or backwardly respectively, the user's hands are swung forwardly or backwardly correspondingly and the user's body is also shaken correspondingly, so the pedometers carried in different positions of the body will detect different step-numbers and different vibration strengths. However, because of difference of vibration strength, the pedometer may detect different vibration times, and the precision of counting the step-number is also impacted naturally. Therefore, it is still inconvenient to operate the traditional pedometer in practical application.

Therefore, how to solve the problem that step-number is easily incorrect while the traditional pedometer is carried for counting foot-step during walking, and the problem that the step-number becomes more incorrect due to the walk speed variation, is an important subject to study in the related technology.

SUMMARY OF THE INVENTION

Therefore, In view of the aforesaid problems, the inventor designs a method of counting step-number according to long-term experience and multiple tests. In this method, a g-sensor of an electronic device is used to detect G values and G values at Y axis, and the electronic device performs cross-comparison on step-number of G values and step-number of G values at Y axis, to precisely compute the step-number during walking.

Main objective of the present disclosure is that in the step of detecting step-number the g-sensor of the electronic device detects whether a movement speed is normal (step-number is counted per second), i.e. the detection result is the G value, or the movement speed has abnormal variation (different conditions, such as step-number is counted per two seconds or five seconds), i.e. the detection result is the G value at Y axis, and then the electronic device computes the step-number according to sums of maximum values and minimum values of speed variations every second within a counting period, and average of the sums. Finally, the processing unit of the electronic device determines the variation of the step-numbers of the G values and the G values at Y axis, and selects one of the two step-numbers for use as a correct step-number detection result, so as to achieve the objective of precisely computing step-number upon the speed variation.

Secondary objective of the present disclosure is that the electronic device is provided with various electronic components such as the g-sensor, the processor and the display screen, and the electronic device can be carried at different limb portion of the human body. The G values and G values at Y axis are generated correspondingly to different rhythms of limb portions, and the processor can perform different computations to obtain the accurate step-number within a predetermined time, so as to prevent from the larger step-number difference caused by factors of the human body or the electronic device being carried at different portions.

Another objective of the present disclosure is that the g-sensor can detect the speed value and the electronic device determines the speed variation to generate G values at normal speed and G values at Y axis at varied speed, and then computes an average of sums of the maximum values and the minimum values of the G values and G values at Y axis every second ($\{[$maximum value (Max)+minimum value (Min)$]\}/2$), for use as a threshold of step-number detection. The threshold is compared with previous G values or G values at Y axis, and later G values or G values at Y axis, to achieve the objective of accurately counting the step-number and provide an accurate reference of the step-number.

Other objective of the present disclosure is that the electronic device includes a processor, a g-sensor, and a display screen, a storage unit, an operating unit and a power supply unit electrically connected to the processor respectively, and the electronic device can be a smart watch, a smart phone, a pedometer, etc., to be carried at different portion such as wrist, ankle, waist, lower leg, thigh, head portion, etc. The g-sensor can detect the vibration generated by movement of the human body, and generate different values indicating normal speed and speed variation, and then transmit the generated value to the processing unit for computation, and the value can be stored in a storage unit or the stored value can be read from the storage unit. The step-number can be shown on the display screen, and the display screen can be a liquid crystal display screen, EL display screen or LED display screen.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
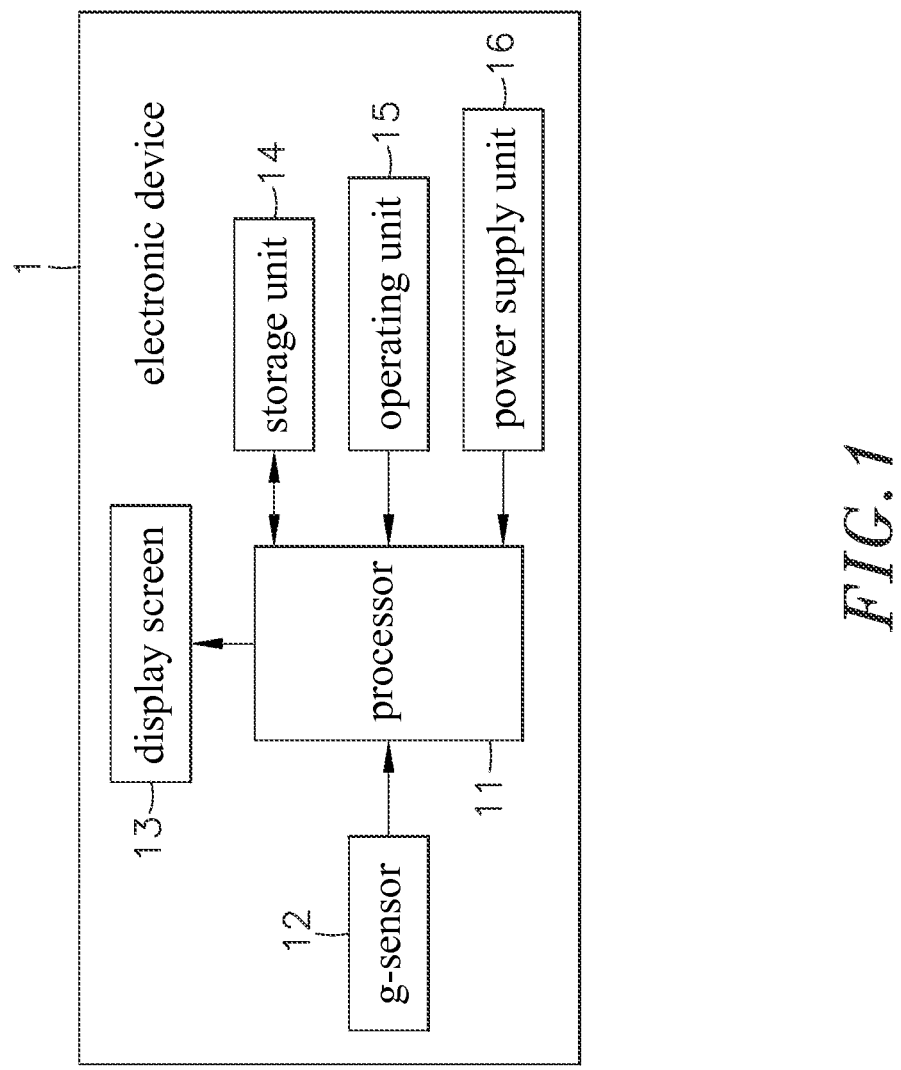
FIG. 1 is a block diagram of a structure of a pedometer of the present disclosure.
Figure 2:
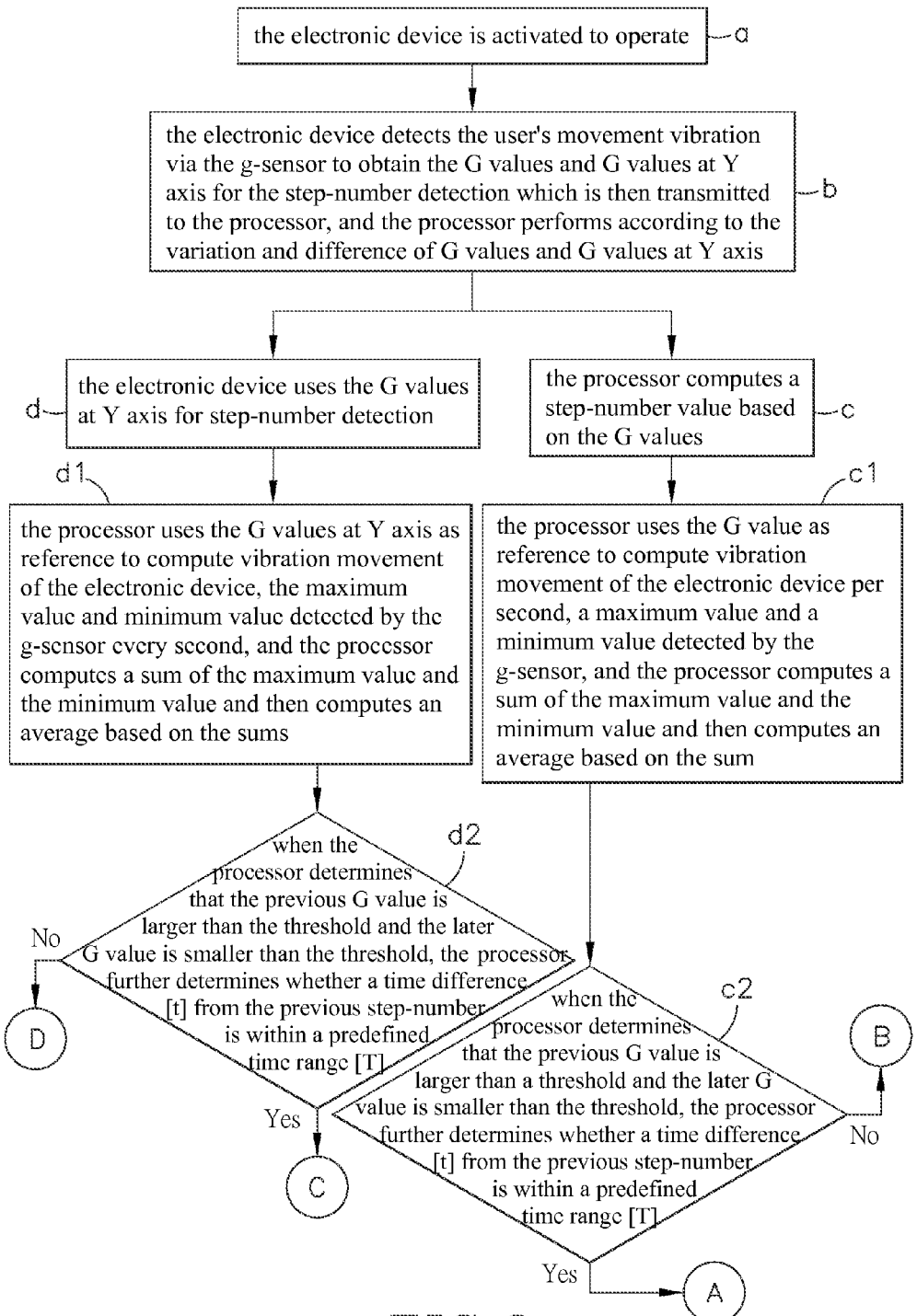
FIG. 2 is a flow diagram (A) of a method of counting step-number executed by the pedometer of the present disclosure.
Figure 3:
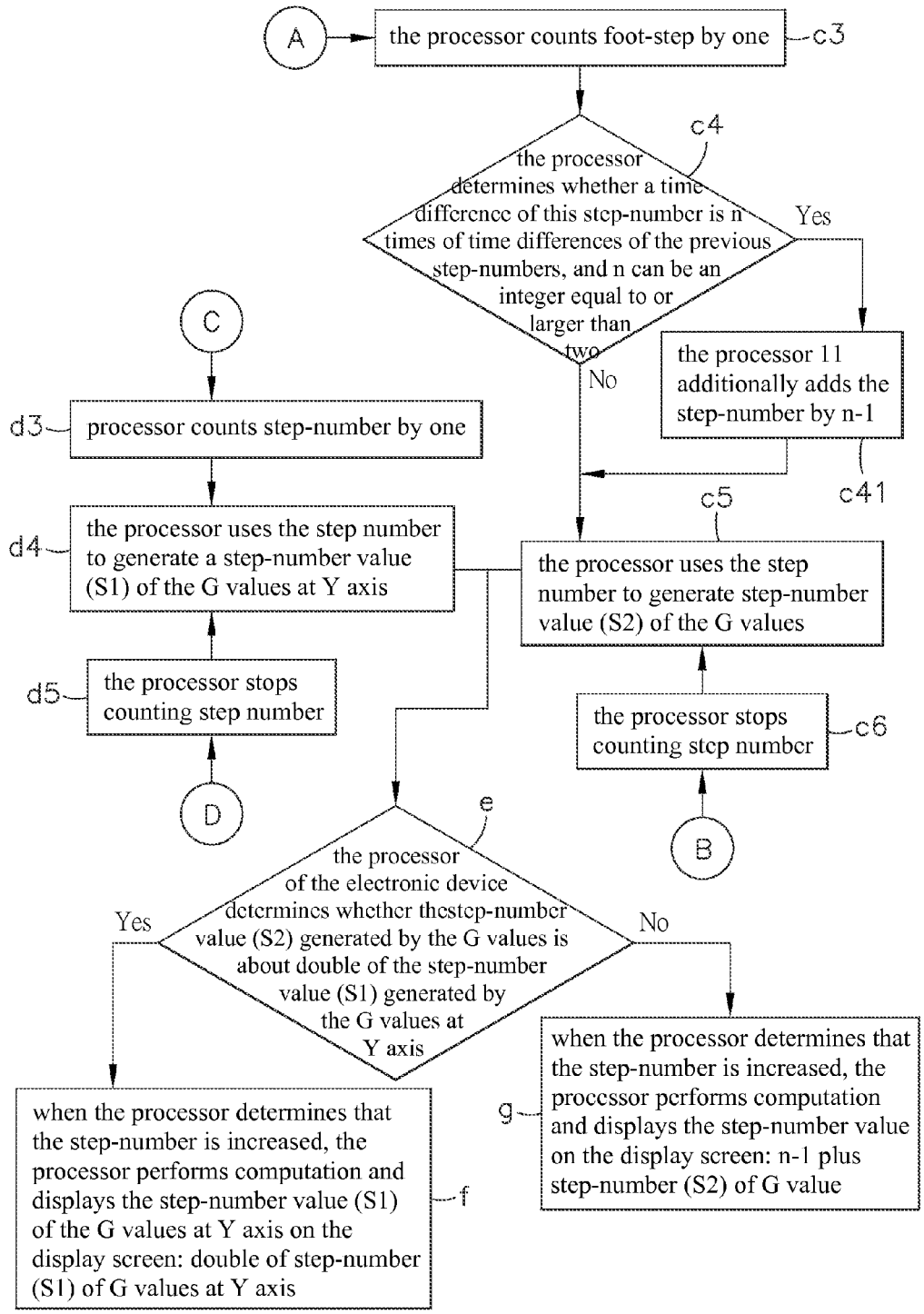
FIG. 3 is flow diagram (B) of the method of counting step-number executed by the pedometer of the present disclosure.
Figure 4:
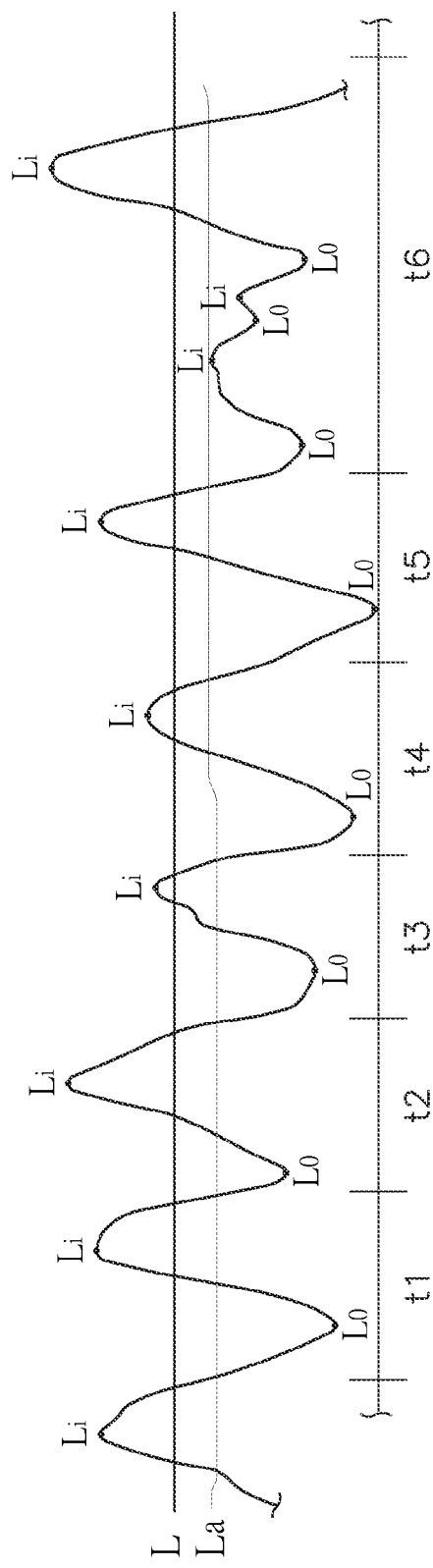
FIG. 4 is a curve diagram of vibration detected by the pedometer of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 4 which show block diagram of a structure of a pedometer of the present disclosure, flow diagrams (A) and (B) of a method of counting step-number executed by the pedometer, and curve diagram of vibration detection. The electronic device 1 of the present disclosure includes a processor 11, and a g-sensor 12, a display screen 13, a storage unit 14, an operating unit 15 and power supply unit 16 which are electrically connected to the processor 11 respectively.

The electronic device 1 can be a device capable of computing step movement times, such as a smart watch, a smart phone or a pedometer, etc. The processor 11 disposed inside the electronic device 1 can be a central processor (CPU), a chip or a microprocessor, etc., the display screen 13 electrically connected to the processor 11 can be a liquid crystal display screen, EL display screen or LED display screen, etc. The g-sensor 12 is configured for detecting variation of times of the electronic device 1 being vibrated within a predetermined time, and generating a G value indicating normal speed, G value at Y axis indicating varied speed, etc. The g-sensor 12 transmits the different G values and G values at Y axis to the processor 11 for further computation, and the correct step-number value obtained from the computation is then displayed on the display screen 13 and stored in the storage unit 14. The processor 11 can also access the value stored in the storage unit 14. The power supply unit 16 can supply the power required for the operation of the electronic device 1. The power supply unit 16 can be one of various power sources, such as a dry battery, a rechargeable battery, a lithium ion battery or a power bank electrically connected with power transmission line, to provide power required by the electronic device 1. The operating unit 15 electrically connected with the processor 11 of the electronic device 1 can be a button, a knob, a switch or a touch control keyboard, etc., and provide to operation functions of the electronic device 1, such as the functions of turning on/off or charging the electronic device 1. Steps of the electronic device 1 performing the step-number detection are described at sections below.

In step (a), the electronic device 1 is activated to operate and carried at different portion of the user's body, such as the user's wrists, ankles, lower legs, thighs, waist or head, etc.

In step (b), the electronic device 1 detects the user's movement vibration via the g-sensor 12 to obtain the G values and G values at Y axis for the step-number detection which is then transmitted to the processor 11. The processor 11 performs steps (c) and (d) according to the variation and difference of G values and G values at Y axis.

In step (c), the processor 11 computes a step-number value based on the G values, and performs following steps.

In step (c1), the processor 11 uses the G value as reference to compute vibration movement of the electronic device 1 per second, a maximum value and a minimum value detected by the g-sensor 12, and the processor 11 computes a sum of the maximum value and the minimum value and then computes an average based on the sum. The computation function is listed below:

$$\{[\text{maximum value (Max)} + \text{minimum value (Min)}]\}/2$$

In step (c2), when the processor 11 determines that the previous G value is larger than a threshold and the later G value is smaller than the threshold, the processor 11 further determines whether a time difference [t] from the previous step-number is within a predefined time range [T]; if yes, a step (c3) is further performed; otherwise, if no, the a step (c6) is further performed.

In the step (c3), the processor 11 counts foot-step by one.

In step (c4), the processor 11 determines whether a time difference of this step-number is n times of time differences of the previous step-numbers, and n can be an integer equal to or larger than two. If yes, step (c41) is performed; otherwise, a step (c5) is performed.

In step (c41), the processor 11 additionally adds the step-number by n−1, and step (c5) is then performed.

In step (c5), the processor 11 uses the step number to generate step-number value (S2) of the G values, and step (e) is then performed.

In step (c6), the processor 11 stops counting step number, and performs the step (c5).

In step (d), the electronic device 1 uses the G values at Y axis for step-number detection, and performs following steps.

In step (d1), the processor 11 uses the G values at Y axis as reference to compute vibration movement of the electronic device 1, the maximum value and minimum value detected by the g-sensor 12 every second, and the processor 11 computes a sum of the maximum value and the minimum value and then computes an average based on the sums. The computation function is listed below:

{[maximum value (Max)+minimum value (Min)]}/2

In step (d2), when the processor 11 determines that the previous G value is larger than the threshold and the later G value is smaller than the threshold, the processor 11 further determines whether a time difference [t] from the previous step-number is within a predefined time range [T]; if yes, a step (d3) is further performed; otherwise, if no, a step (d5) is further performed.

In the step (d3), the processor 11 counts step-number by one.

In step (d4), the processor 11 uses the step number to generate a step-number value (S1) of the G values at Y axis, and then performs step (e).

In step (d5), the processor 11 stops counting step-number, and then performs the step (d4).

In step (e), the processor 11 of the electronic device 1 determines whether the step-number value (S2) generated by the G values is about double of the step-number value (S1) generated by the G values at Y axis. If yes, step (f) is performed; otherwise, if no, step (g) is performed.

In the step (f), when the processor 11 determines that the step-number is increased, the processor 11 performs computation and displays the step-number value (S1) of the G values at Y axis on the display screen 13. The computation equation is: double of step-number (S1) of G values at Y axis.

In the step (g), when the processor 11 determines that the step-number is increased, the processor 11 performs computation and displays the step-number value on the display screen 13. The computation equation is:

n−1 plus step-number (S2) of G value.

Figure 5:
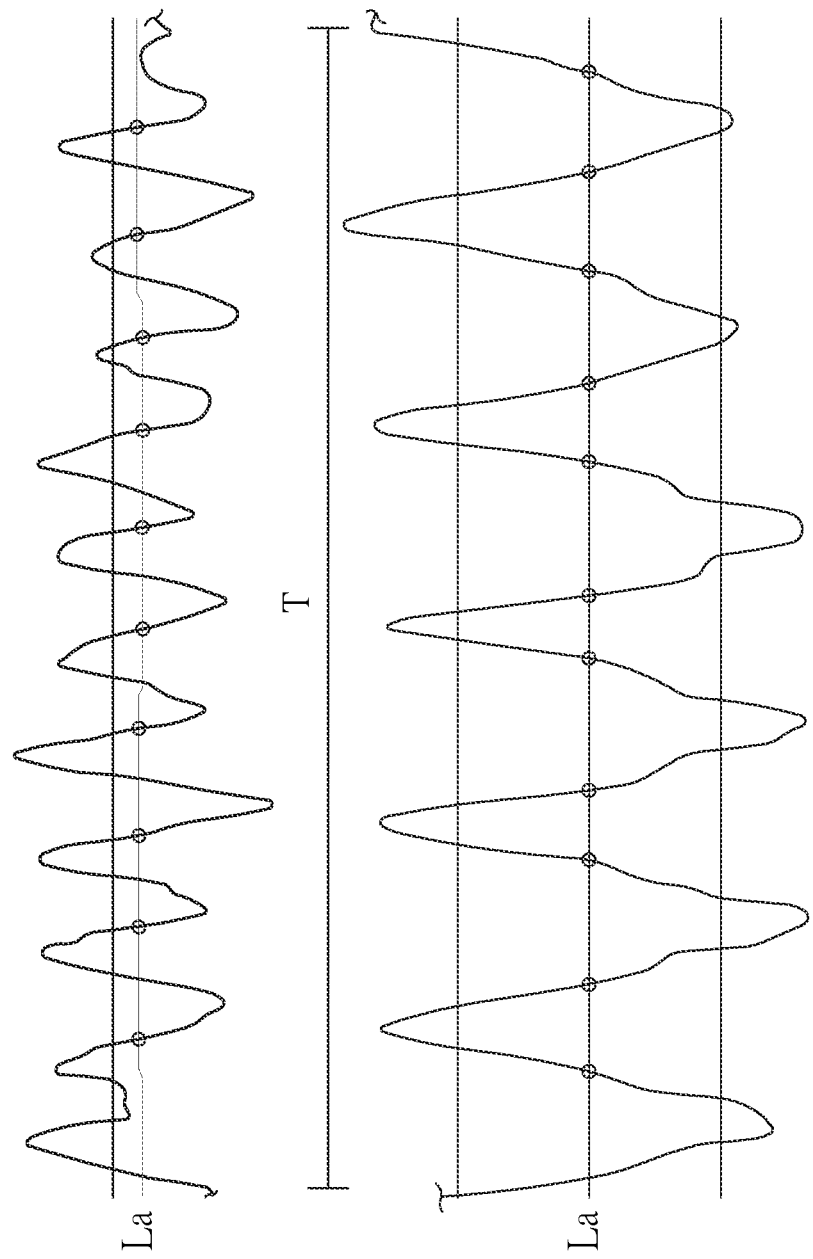
FIG. 5 is a curve diagram of G-values and G-values at Y axis detected by the pedometer of the present disclosure.

In the steps of method of detecting the step-number, the electronic device 1 is mounted at different portions of the user's body, so the g-sensors 12 of the electronic device 1 may detects different vibration times and generate different detection results. Please refer to FIG. 1, FIG. 4 and FIG. 5 which show block diagram of a pedometer of the present disclosure, curve diagram of vibration detection, and curve diagram of G values and G values at Y axis. After the electronic device 1 is activated by the operating unit 15, every second [t1, t2, t3~t6 . . . ] the g-sensor 12 may detect different vibration state because of the electronic device 1 being carried at different portions of the user's body (such as wrist, ankle, lower leg or waist, etc.), and generate different vibration frequency curve [G values] correspondingly. The different vibration state may be affected by the difference between swinging forces of dual hand's forward and backward swinging, or different sizes of step, or different amplitudes of body swinging, or the fitness variation at beginning, midway and back-end of step-number counting. However, the body rhythm may be affected by internal factors or external factors, the internal factors including the body function variation, body tired state at beginning of action, during action or after action (such as walk or brisk walking), or different action time (such as morning, afternoon or evening), or different ages, may affect the action of the body rhythm to generate different variation. The external factors include place (such as cement floor, lawn, mud ground, ramp, stair, etc.), weather (the four seasons, sunshine, cloudy day, etc.), distance or environment (road, playing field, gymnasium, etc.). Various internal factors and external factors affect body rhythm and cause variation, so that the g-sensor 12 of the electronic device 1 also detects the different rhythm of the user's body and generates different detection curve signals (please refer to FIG. 4 at the same time), i.e. G values which combine data at three axes, as described in step (c) through step (c6). The curve of G values may swing above or below the reference line (L), and the processor 11 computes the maximum value (Max) indicating a peak point Li of the curve, and the minimum value (Min) indicating a valley point Lo of the curve, and computes the threshold (La) according to the sum of the maximum value and the minimum value. The equation is listed below:

[maximum value+minimum value]/2.

At the sixth second (t6), the g-sensor 12 detects an instable vibration state and the curve is located below the threshold (La), it is possible that the user's body rhythm variation causes the vibration amplitude to become smaller (various state effects such as hand being put in pocket, walk speed slower or temporarily stop for one or two seconds), so it causes that the curve of the G value cannot be detected precisely, and the threshold for detection cannot be generated.

During the body rhythm and step-number counting, the g-sensor 12 of the electronic device 1 detects value of the body rhythm (i.e. G values) and value of direction of movement (i.e. G values at Y axis), and the processor 11 performs comparison analysis on the G values (the upper curve shown in FIG. 5) and the G values at Y axis (the lower curve shown in FIG. 5) according to the curve of the G values at Y axis (described at step d through step d5, and the Y axis is an axe parallel with the direction of movement of the human body in 3D space). During a predefined time (T, such as two seconds, three seconds, five seconds or six seconds, and can be adjusted by the electronic device 1 upon practical condition), the step-number value (S2) of G values can be generated after the comparison of the threshold (the circle portion of the upper curve shown in FIG. 5) and the curve of the G values generated due to the body rhythm, and the step-number value (S1) of the G values at Y axis can be generated after comparison of the threshold (the circle portion of the lower curve shown in FIG. 5) and the curve of the G values at Y axis generated at the direction of body movement. If the step-number value (S2) of the G values is about double of the step-number value (S1) of G values at Y axis, for example, step-number value (S2) of G values is 5, 6 or 7, and the step-number value (S1) of G values at Y axis is 3, the double of the step-number value (S1) of G values [(S1=3)×2=6] at Y axis is adopted for use as a result of step-number, and the result of the step-number value is shown at display screen 13 to inform the step-number value of G values at Y axis [(S1)=6].

If the processor 11 determines that the step-number value (S2) of the G values is not about double of the step-number value (S1) of the G values at Y axis, for example, the step-number value (S2) of G values is 8, 9, 10, etc. and the step-number value (S1) of the G values at Y axis is 3, the step-number value (S2) of the G values is adopted for use as a result of step-number, and the result of the step-number value is shown on the display screen 13 to inform the step-number value of G values [(S2)=8, 9, 10, etc.].

The processor 11 of the electronic device 1 performs the cross comparison analysis on the G values and the G values at Y axis detected by the g-sensor 12, and the electronic device 1 determines the G values indicating the normal rhythm state and the G values at Y axis of variation of the body rhythm affected by the internal or external factors during walking, and performs more detailed analysis on the step-number value variation between the G values and the G values at Y axis within the predetermined time to efficiently and precisely detect the result of the step-number value. The step-number of the rhythm variation will not be ignored because the body is affected by the internal or external factors, it means that the electronic device 1 can obtain more accurate step-number value by cross-comparison analysis between the G values and the G values at Y axis, so as to achieve the objective of accurately count the step-number during walking.

Thus, the above-mentioned content is a preferred embodiment of the present disclosure, but scope of the present disclosure is not limited thereto. In the method of counting step-number applied in electronic device, the g-sensor 12 of the electronic device 1 is used to detect the vibration frequency of the body rhythm to generate two different step numbers including the G values and the G values at Y axis, and the processor 11 performs cross-comparison analysis to determine the difference between the G values and the G value at Y axis for selecting a better value for use as a step-number, and the display screen 13 shows this step-number. Therefore, the objective of accurately detecting the step-number can be achieved, the step-number detection will not be affected by internal factors or external factors, so the condition of inaccurate step-number does not happen, and the electronic device 1 can accurately detect the step-number no matter where the electronic device 1 is carried. The electronic device 1 can provide correct step-number as a reference for the user.

Therefore, the present disclosure mainly directs to design the method of counting step-number applied in the electronic device, and use the g-sensor of the electronic device to detect frequency of the body rhythm to obtain the G values caused by the normal rhythm and the G values at Y axis caused by varied rhythm, and then use the processor to compute the G value at Y axis and perform cross-comparison, so as to achieve the objective of showing accurate step-number on the electronic device. The electronic device of the present disclosure has advantages in that the electronic device still detects the rhythm indicating the amplitude of the body vibration even being carried different portion of the body, and provides accurate step-number without being affected by the internal factors or external factors. Therefore, the user can obtain correct step number from the information shown on the display screen of the electronic device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method of counting a step-number applied in an electronic device, comprising processes of:
    (a) activating the electronic device;
    (b) in the electronic device, using a g-sensor to obtain first G values that indicate values of body rhythm, and second G values, which are G values at Y axis that indicate values of direction of movement, for step-number detection, and performing processes (c) and (d) according to the variation difference of the first G values and the second G values;
    (c) performing the step-number detection according to the first G value by following processes;
    (c1) computing a maximum value [Max] and a minimum value [Min] of the first G values every one second, and computing a threshold by: an equation of [maximum value+minimum value]/2;
    (c2) in a condition of a previous one of the first G values larger than the threshold and a later one of the first G values smaller than the threshold, determining whether a time [t] from a previous step is within a predefined time range [T], wherein if the time [t] from the previous step is within the predefined time range [T], a process (c3) is further performed, and wherein if the time [t] from the previous step is not within the predefined time range [T], process (c6) is further performed;
    (c3) counting the step-number by one;
    (c4) determining whether a time of a current step is n times of time differences of the previous steps, where n is an integer equal to or larger than two, wherein if the time of the current step is n times of the time differences of the previous steps, process (c41) is performed, and wherein if the time difference of the current step is not n times of time differences of the previous steps, process (c5) is performed;
    (c41) additionally adding the step-number by n−1, and performing process (c5);
    (c5) generating the step-number (S2), and performing process (e);
    (c6) stopping counting the steps, and performing process (c5);
    (d) by the electronic device, adopting the second G values for step-number detection, and performing following processes;
    (d1) computing the maximum value [Max] and the minimum value [Min] of the second G values every one second, and computing the threshold by the equation of [maximum value+minimum value]/2;
    (d2) in a condition of a previous one of the second G values larger than the threshold and a later one of the second G values smaller than the threshold, determining whether a time [t] from the previous step is within a predefined time range [T], wherein if the time [t] from the previous step is within the predefined time range [T], process (d3) is further performed, and wherein if the time [t] from the previous step is not within the predefined time range [T], process (d5) is further performed;

(d3) counting the step-number by one;

(d4) generating a step-number (S1), and performing step-process (e);

(d5) stopping counting the steps, and performing process (d4);

(e) by the processing unit of the electronic device, determining whether the step-number (S2) generated by the first G values is double of the step-number (S1) generated by the second G values, and wherein if the step-number (S2) generated by the first G values is double of the step-number (S1) generated by the second G values, process (f) is performed, and wherein if the step-number (S2) generated by the first G values is not double of the step-number (S1) generated by the second G values, process (g) is performed;

(f) increasing the step-number, and displaying the step-number as: double of the step-number (S1) generated by the second G values; and (g) increasing the step-number, and displaying the step-number as: [n−1] plus the step-number (S2) generated by the first G value.

2. The method as defined in claim 1, wherein the electronic device is a smart watch, a smart phone or a pedometer, and the first G values computed in process (b) indicate normal step-number in regular frequency, and the second G values computed in process (d) indicate the step-number in irregular frequency.

3. The method as defined in claim 1, wherein the threshold defined in process (c1) and process (d1) is an average of the maximum value and minimum value in speed variations of step movement detected within every second.

4. The method as defined in claim 1, wherein the threshold of time difference of the step-number computed in process (c2) and process (d2) is time for counting foot-step once every one second or every two seconds; and the set time range [T] is a time range exceeded the previous step-number time by 5 seconds or 10 seconds.

5. The method as defined in claim 1, wherein the step-number value (S2) computed in process (c5) and the step-number value (S1) computed in process (d4) are the step-number value shown on a display screen of the electronic device when the step moving speed detected by the g-sensor of the electronic device is zero, wherein the display screen of the electronic device is a LCD display screen, EL display screen or a LED display screen, and the processing unit of the electronic device used in process (e) configured for determining the step-numbers (S1) and (S2) is a CPU, a chip or a microprocessor.

* * * * *